(12) United States Patent
Khurgin

(10) Patent No.: US 10,908,610 B2
(45) Date of Patent: Feb. 2, 2021

(54) METHOD OF VEHICLE OPERATION IN A MIXED MODE

(71) Applicant: Daniel Khurgin, Pikesville, MD (US)

(72) Inventor: Daniel Khurgin, Pikesville, MD (US)

(*) Notice: Subject to any disclaimer, the term of this patent is extended or adjusted under 35 U.S.C. 154(b) by 6 days.

(21) Appl. No.: 16/014,361

(22) Filed: Jun. 21, 2018

(65) Prior Publication Data

US 2019/0391579 A1 Dec. 26, 2019

(51) Int. Cl.
| | |
|---|---|
| *G05D 1/00* | (2006.01) |
| *G07C 5/08* | (2006.01) |
| *G01V 1/00* | (2006.01) |
| *G01V 8/10* | (2006.01) |
| *G01V 9/00* | (2006.01) |
| *B60R 25/24* | (2013.01) |

(52) U.S. Cl.
CPC ......... *G05D 1/0088* (2013.01); *B60R 25/24* (2013.01); *G01V 1/001* (2013.01); *G01V 8/10* (2013.01); *G01V 9/00* (2013.01); *G05D 1/0061* (2013.01); *G07C 5/0808* (2013.01)

(58) Field of Classification Search
CPC .... G05D 1/0088; G05D 1/0061; B60R 25/24; G01V 1/00; G01V 8/10; G01V 9/00; G07C 5/0808
See application file for complete search history.

(56) References Cited

U.S. PATENT DOCUMENTS

| | | | | |
|---|---|---|---|---|
| 2017/0316621 A1* | 11/2017 | Jefferies | ............... | G07C 5/0808 |
| 2018/0202822 A1* | 7/2018 | DeLizio | ............ | G01C 21/3407 |
| 2018/0341274 A1* | 11/2018 | Donnelly | .......... | G08G 1/096827 |
| 2019/0051173 A1* | 2/2019 | Kang | ................ | B60W 30/0953 |
| 2019/0064805 A1* | 2/2019 | Frazzoli | ............... | G05D 1/0061 |
| 2019/0204827 A1* | 7/2019 | Bhalla | .................. | G05D 1/0061 |

FOREIGN PATENT DOCUMENTS

JP 2005332291 A * 12/2005

* cited by examiner

*Primary Examiner* — Aaron L Troost
(74) *Attorney, Agent, or Firm* — Nadya Reingand; Yan Hankin

(57) ABSTRACT

The invention provides a method and system for a vehicle to shift between an autonomous mode and a manual mode, and vice versa. This shifting is dependent on multiple criteria, including but not limited to extra weight inside the vehicle, passengers inside the vehicle, one or more sensors, whether the vehicle is in park, and whether the vehicle is at the final location. The invention also includes several components such as users, vehicles, a central processor, and maintenance stations. According to the method, no passengers are permitted on board the vehicle when it is in autonomous mode, and the vehicle will be on the road for an extended and longer amount of time compared to rental vehicles because the vehicles can automatically drive towards a new user or towards a maintenance station, thus utilizing the time during which the vehicle would otherwise be idle.

19 Claims, 4 Drawing Sheets

METHOD OF VEHICLE OPERATION IN A MIXED MODE

FIELD OF INVENTION

This patent application is related to autonomous and semi-autonomous vehicles and a method of their operation and use.

BACKGROUND OF INVENTION

The technology of self-driving vehicles now is becoming widely available, but its penetration into commonplace is hindered by psychological barriers. While most people are comfortable seeing driverless cars on the road, they do not feel comfortable not being in control sitting in a vehicle without a driver. That is why it is quite possible that delivery trucks will be the first widespread application of driverless vehicles.

At the same time, rental vehicle fleets are used very inefficiently, as rental vehicles spend most of the time parked, which not only reduces revenue, but also takes valuable parking space and increases user expenses by paying for parking.

Alternatives to vehicle rental are taxies ridesharing, and other human driven vehicles, where the cost is prohibitively high due to cost of labour. Services such as Zipcar can reduce the amount of idle time but are inconvenient as the travel can only be from and to a certain predetermined location. Autonomous vehicles seem to be the perfect solution to the high cost of taxis, and ridesharing, but not to the aforementioned psychological barriers of driverless vehicles. The invention provides solutions which are free from above-mentioned disadvantages.

The inherent feature of the system is its flexibility, for example, the user can change plans in case of heavy traffic, and exit the vehicle at any time, and the vehicle can proceed to a new destination provided by the central destination in autonomous mode from this point.

SUMMARY OF INVENTION

The invention provides a method and system for one or more vehicles to shift between an autonomous mode and a manual mode, and vice versa, as well as each vehicle being in communication to a central processor. This central processor also communicates with users, maintenance stations, and other terminals making up the system. This shifting between modes is dependent on multiple criteria, including but not limited to extra weight inside the vehicle, passengers inside the vehicle, whether the vehicle is in park, and whether the vehicle is at the final location. Such multiple criteria is determined via one or more sensors. No extra weight should be inside the vehicle lest it drive off with the users' belongings. The requirement of no person to be inside the vehicle during autonomous mode mirrors recent studies which point to the fact that humans are reluctant to be in a self-driving vehicle. Determining whether the vehicle is parked at the final location is performed by the central processor, as being in a parked position is a requirement for the vehicle to shift to the manual mode.

The invention also describes a system which includes several components such as users, vehicles, a central processor, and maintenance stations. In the method, no passengers are allowed on board the vehicle when it is in autonomous mode, but the vehicle is on the road for an extended amount of time compared to rental vehicles. Rental vehicles spend the majority of their time at a hub, waiting to be rented by a user; however, by the present method, the vehicles may drive autonomously towards a new user, or towards a maintenance station, thus utilizing idle time more efficiently.

DETAILED DESCRIPTION OF THE PREFERRED EMBODIMENT

Figure 1:
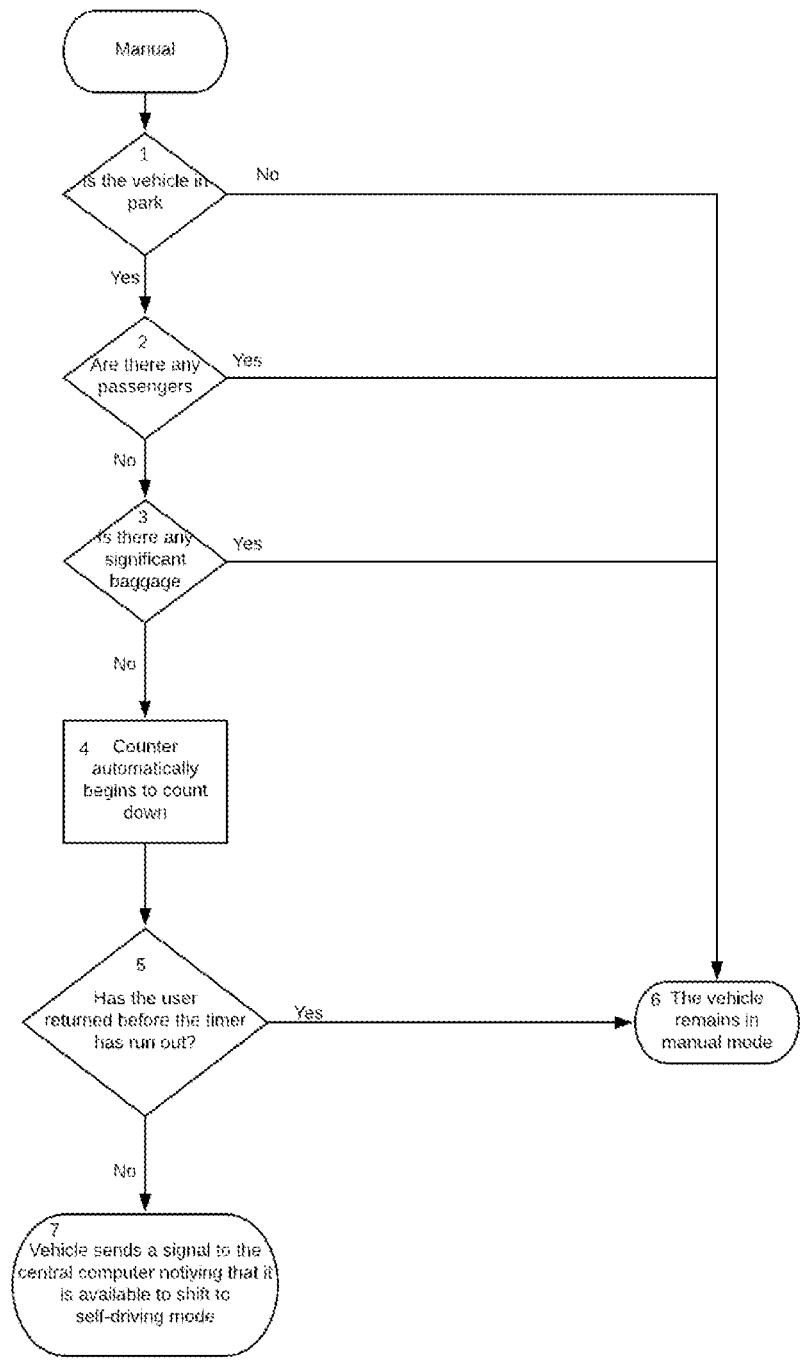
FIG. 1 is a flowchart of the process for switching between the manual mode to the autonomous mode.

In this patent application, the term idling is user to describe a vehicle not being used. In this application, renting means hiring a vehicle for a certain amount of time. The user in this application is a human who uses the vehicle for driving.

The pool of vehicles of this system are connected with a two-way link to a central system, which provides monitoring of the location and performance of all the vehicles in real time, and when a prospective user requests a ride, the central station sends a command to a nearby vehicle to proceed to the requested location.

This method application discloses a system of multiple vehicles having dual modes of operation. Human-operated mode (i.e. manual mode) is used to transport the user and/or passengers through a number of destinations, and fully autonomous mode (i.e. autonomous mode) is used to transport the vehicle when not being used to transport a user. All vehicles participating in this system are equipped with a transmitter and receiver which provide a data link to the centre station, which dispatches vehicles according to a user's request. Additionally, in the absence of demand, the central station may use real time information to anticipate demand and dispatch vehicles accordingly, to a parking station, or additionally, to recharge/refuel. For example, the central station can dispatch vehicles to sports or entertainment venues ahead of the time when the public is expected to exit.

Examples of autonomous vehicles that may operate in dual modes include but are not limited to self-driving cars, trucks, buses, motorcycles, bikes, aerial vehicles, and naval vehicles.

The method operates as follows, the user requests a vehicle at a specified time at a specific location. All users that use this system of cars are registered. This registration is similar to that of Zipcar or car rentals, which requires a driver's license, credit card, and optionally, insurance. Payment is performed by withdrawing money from a credit card already on file, and other methods of payment such as Apple Pay, PayPal, and others may be used to achieve payment.

Users request a car using a smartphone, or through any internet connection by submitting a request to a central station through a central processor. Such a request may be submitted and processed via any currently known method. The central station preferably includes a network of local dispatching units monitoring and dispatching vehicles in a certain geographical area. When the user sends a request to the central station through the central processor, the central processor may reroute the request to a local dispatch unit processor, each dispatch unit processor being associated with a designated local area such that the central processor does not have to cover an entire area. The dispatch unit processor then determines availability of the vehicles in its area and sends a vehicle in an autonomous mode to the requested location. The central processor also sends feedback to the user and sends a secure key allowing the user to open and operate (i.e. access) the vehicle.

In one embodiment, the user makes a Bluetooth connection from his phone to the on-board computer and enters the digital key given by the central processor, which unlocks the doors and allows for user operation.

In another embodiment, the phone used to create the request is registered with the central station and central processor, and the vehicle recognizes the phone due to a signal the phone has received from the central station or central processor, thus allowing for user operation.

In another embodiment, the user receives a sequence of alphanumeric characters from the central station or central processor and physically enters the key into the vehicle, unlocking the doors allowing for user operation.

Once the vehicle is unlocked, the user may operate the vehicle to one or more destinations. When a vehicle exits one dispatching unit's area and enters another dispatching unit's area, control is transferred to that new dispatching unit's processor.

Upon arrival at a desired location, the user exits the vehicle and contacts the central station through one of the base stations to release the vehicle from their control. Alternatively, and preferably, the vehicle is able to determine on its own when a user has permanently left the vehicle. When the user, or preferably the vehicle, sends a signal through the base station to the central station and central processor, the vehicle is sent a signal to switch to fully autonomous mode. Alternatively, the user shifts the vehicle operation mode from human operated to fully autonomous mode, and the vehicle sends a signal to the central station about the end of use by this user. Once released from a user, the vehicle enters the pool of available vehicles and can be dispatched to the next user via the central processor. Alternatively, the central station and central processor may dispatch the vehicle to drive to a parking location, or a charging/refueling/maintenance station in automated mode.

In one embodiment, before making a request, the user provides information regarding the desired location and estimated time of vehicle drop off.

When the vehicle is used by the user, the user is driving the vehicle, and when they have finished driving, they give a signal that they are finished with the vehicle, and that vehicle may drive itself to another user, and the first user gives a signal for when and where to get a vehicle a next time. In preferred embodiments, the vehicle is able to determine automatically when to switch between modes (from manual to autonomous) in order to automatically switch to autonomous mode and drive itself to a next location, based on instructions from the central processor.

Example. A user knows that he will go to sleep and will need a vehicle in eight hours. If the user has a rental vehicle, then typically, that vehicle will stay in a parking lot or parked in some other way for those eight hours. With this idea, that vehicle may drive around and serve other purposes for that time, and after that time has elapsed, the user will have a vehicle ready for him, whether it be the first vehicle or a different one. This applies as well for a businessperson who needs to attend a meeting in a busy city, for that user will not need to pay for expensive parking, and while they are in their meeting, that vehicle may serve another user, or park in a designated parking area, where the vehicle may fuel or charge up.

In a preferred embodiment, the vehicle is electrically powered, which provides an option to drive itself to charge up at the nearest electric charging station at the time that a user does not require it.

In one embodiment, the proposed method includes the use of the carpool in prescheduled, multiple time use of the system. For example, in a business trip, that would include travel from an airport to a hotel, from the hotel to the meeting location, back to the hotel after the meeting, and back to the airport the next morning. The car may arrive at predetermined times for each leg of the trip, so the user does not need to request different legs of the trip at different times.

There are several options in which to achieve charging (or refuelling) of a vehicle associated with the method of the present invention:

The vehicle drives itself to a charging station where it automatically charges itself, this can be done by an automatic robot which plugs the vehicle into the outlet, or it may be achieved wirelessly, for example, inductively.

The vehicle drives to the charging station to a human operated charging station where a human operator manually plugs the vehicle into the outlet according to instructions given by the car, whether it be for a certain amount of allotted time, or for a full charge.

If the vehicle is not fully electric, for example a hybrid gas-electric vehicle or fully gas powered, it drives itself to the gas station for refuelling when a user does not require it.

In one embodiment, the self-driving vehicle is capable of delivery of items when not in demand of users, similar to food or package delivery services and systems.

In a preferred embodiment, the invention comprises a system and method for detecting the presence of a driver and passenger within a vehicle capable of mixed mode operation. The system for detecting comprises one or more sensors which relay a signal to the operating system of the vehicle in order to switch the operating mode of the vehicle from autonomous to manual and vice versa. The sensors may comprise one or more of the following: laser sensors, infrared sensors, weight sensors, video cameras/sensors, audio sensors. The sensors may comprise both a transmitting unit and a receiving unit. If the sensor does not detect an object resembling a passenger, or if the receiving unit does not detect the signal sent by the transmitting unit, a presence of a driver/passenger in the particular seat corresponding to the sensor is presumed by the sensor, and the sensor is capable of sending a signal to the operating system of the vehicle to set it to a manual mode. Such a sensor corresponding to the driver position of a mixed mode vehicle allows for the detection of a presence of a driver and/or passenger without requiring any input from a human user. If the presence of a driver is not detected by the sensing system, the sensing system sends a continuous signal to the operating system of the vehicle to maintain a self-driving (autonomous) mode of operation. The sensing system of the vehicle (i.e. an onboard computer) may also be in communication with the central processor of the central station, as well as dispatch unit processors of other stations.

In a preferred embodiment, the switching between modes of the vehicle with two or more modes of operation occurs automatically and instantaneously without the need for user input because the vehicle is able to determine whether a driver is seated in the driver seat and/or whether a passenger is in the vehicle. Such a system requires the vehicle to be driven in manual mode when a driver or passenger is present, and it allows the vehicle to be self-driving only when no driver is present. The requirement of manual mode when a driver is present specifically addresses the current state of mind of drivers regarding being in a self-driving vehicle and not being in control of the vehicle. Knowing that vehicles according to the present inventive method are the only vehicles on the road, the public can rest assured that those vehicles which contain a driver are being operated by the driver.

Another issue that is addressed by the present invention is that of a driver of a vehicle exiting the vehicle only temporarily and that driver being able to return to the vehicle without the vehicle switching to self-driving mode and abandoning the driver.

Several types of indicators, sensors, and/or mechanisms may be used to determine whether a driver only leaves the vehicle for a short amount of time and plans to return. A first mechanism for determining whether a driver leaves only temporarily, may be a weight sensor located in an area of the vehicle which stores luggage of the driver. Such sensors may be positioned along the rear seat(s) of the vehicle and/or in the trunk of the vehicle. Such sensors preferably comprise weight sensors. If a luggage weight sensor exceeds a given threshold amount of weight, the vehicle assumes that a driver desires to return to the vehicle and that the vehicle should not switch to self-driving mode until the luggage is removed.

Furthermore, the time at which the luggage is placed into the vehicle may also be stamped, such that the vehicle is capable of determining a relationship between the time that luggage is placed into the vehicle and the time that a driver sits in the driver seat, or the time that the driver leaves the driver seat and returns to it. Through such a relationship, the vehicle is able to detect that the driver has initiated a manual use of the vehicle, wherein the manual use of the vehicle is not concluded until a second time relationship is established. The second time relationship comprises another point in time when a driver leaves the driver seat and the luggage exits the vehicle very shortly thereafter (e.g., up to 30 minutes thereafter). Therefore, the vehicle is permitted to switch to autonomous mode only when there is a short period of time (e.g., thirty minutes or less) between the time that a driver exits the vehicle and the time that the luggage sensors no longer sense baggage in the vehicle. Additionally, the vehicle (or the onboard computer of the vehicle) is capable of collecting data for analytics purposes based on all time stamps which are recorded by each user.

A second mechanism for determining whether a driver leaves only temporarily may comprise a counter which provides a time delay prior to the vehicle making any automatic decision about switching modes for operation (especially for a switch from manual to autonomous mode). Such a counter comprises a mechanism which begins counting down from a set amount of time once a driver exits the driver seat of the vehicle. For example, if a driver stops at a convenience store or gas station, and the vehicle does not comprise the luggage sensor discussed above, the vehicle will not switch to self-driving mode immediately and abandon the driver if the driver leaves the vehicle. Instead, a timer may be initiated to provide the driver with a set amount of time to return to the empty vehicle. In practice, the driver may set the time to be any amount of time by entering the amount of countdown manually. However, the vehicle will automatically provide the driver with a preset amount of time (e.g., 30 minutes, or any amount that the driver sets ahead of time as a default amount).

In some aspects, the present invention comprises a system and method for following a separate route for autonomous vehicles, which is distinct from routes for human-operated vehicles. Thus, when a driver is undetected within the vehicle, the vehicle automatically switches to self-driving and the operating system of the vehicle maintains the vehicle along the route intended only for autonomous vehicles. In this regard, self-driving vehicles never interact with manually controlled vehicles. As soon as no driver is detected by the sensor system within the mixed mode vehicle, the operating system of the vehicle directed that vehicle to the route(s) for autonomous vehicles. The route(s) for autonomous vehicles may be underground or otherwise sealed from an external environment. If a passenger is detected without a driver in a vehicle, if available, a third route may be followed for autonomous vehicles containing passengers but no driver. This third route would not be sealed from an exterior environment so that the passenger(s) are able to enjoy a view in case the autonomous vehicle route is enclosed or underground.

Referring now to the drawings, in particular, FIG. 1, a flowchart shows the process of a vehicle switching to an autonomous mode from a manual mode with steps signifying particular requirements before the switch occurs, the steps being performed by the computer on board the vehicle. Step 1 asks whether or not the vehicle is in park. If it is not parked, the vehicle may not switch to an autonomous mode. If the vehicle is parked, the first condition is satisfied and the onboard computer moves onto the next step. The vehicle should only be able to switch to an autonomous mode if the vehicle is in park to avoid any consequences. Such consequences could be a shift from a manual to an automatic mode while performing a turn. The driver would be attempting to steer the vehicle around a bend, but if the vehicle shifted to an automatic mode, the vehicle would not know to complete the turn, and therefore possibly wreck the vehicle.

The second condition asks whether there are any passengers on board the vehicle. This condition is determined using one or more sensors which include but are not limited to laser, audio, visual, video, infrared, or weight sensors. The second condition is signified on the flowchart as step 2. If the vehicle has any passengers on board, it may not shift to an automatic mode, but if it does not contain any passengers, the second requirement is satisfied. This condition is required because studies have been performed which show that many people are unwilling to be passengers in an autonomous car. Many people distrust the ability of a vehicle to adapt correctly to shifting situations in the road, with as much as half of the population reluctant to purchase a car which has the ability to drive itself. See, e.g., Enwemeka, Zeninjor, *"Consumers Don't Really Want Self Driving Cars, MIT Study Finds,"* http://www.wbur.org/bostonomix/2017/05/25/mit-study-self-driving-cars.

A third requirement is signified in step 3 of the flowchart, which asks if there is any significant baggage on board, because if the vehicle switched to autonomous mode without checking if said baggage was still on board, it may leave the user without their baggage. If this baggage is on board, then the vehicle may not switch to an autonomous mode. This condition assures the current user of the vehicle that the vehicle will not be used to transport another user and their potential baggage until the current baggage is removed from the vehicle.

Assuming all other requirements discussed above have been met, a counter begins counting down when a driver is detected as having exited the vehicle. The timer is shown in step 4 of the flowchart. If the timer requirement was not included, the vehicle may switch to an autonomous mode while the user does not intend to leave the vehicle for an extended amount of time. The user can create a value for this counter each time the user exits the vehicle. Alternatively, the user may set a default value for this counter for every time he exits the vehicle.

Step 5 concerns whether or not the user returns before this timer has expired, and if the user has returned within the constraints of the time limit, the vehicle remains in manual mode. Otherwise, the vehicle sends a signal to the central processor that it is available to shift to self-driving mode, and the central processor determines whether the vehicle is needed elsewhere based on additional user requests.

Figure 2:
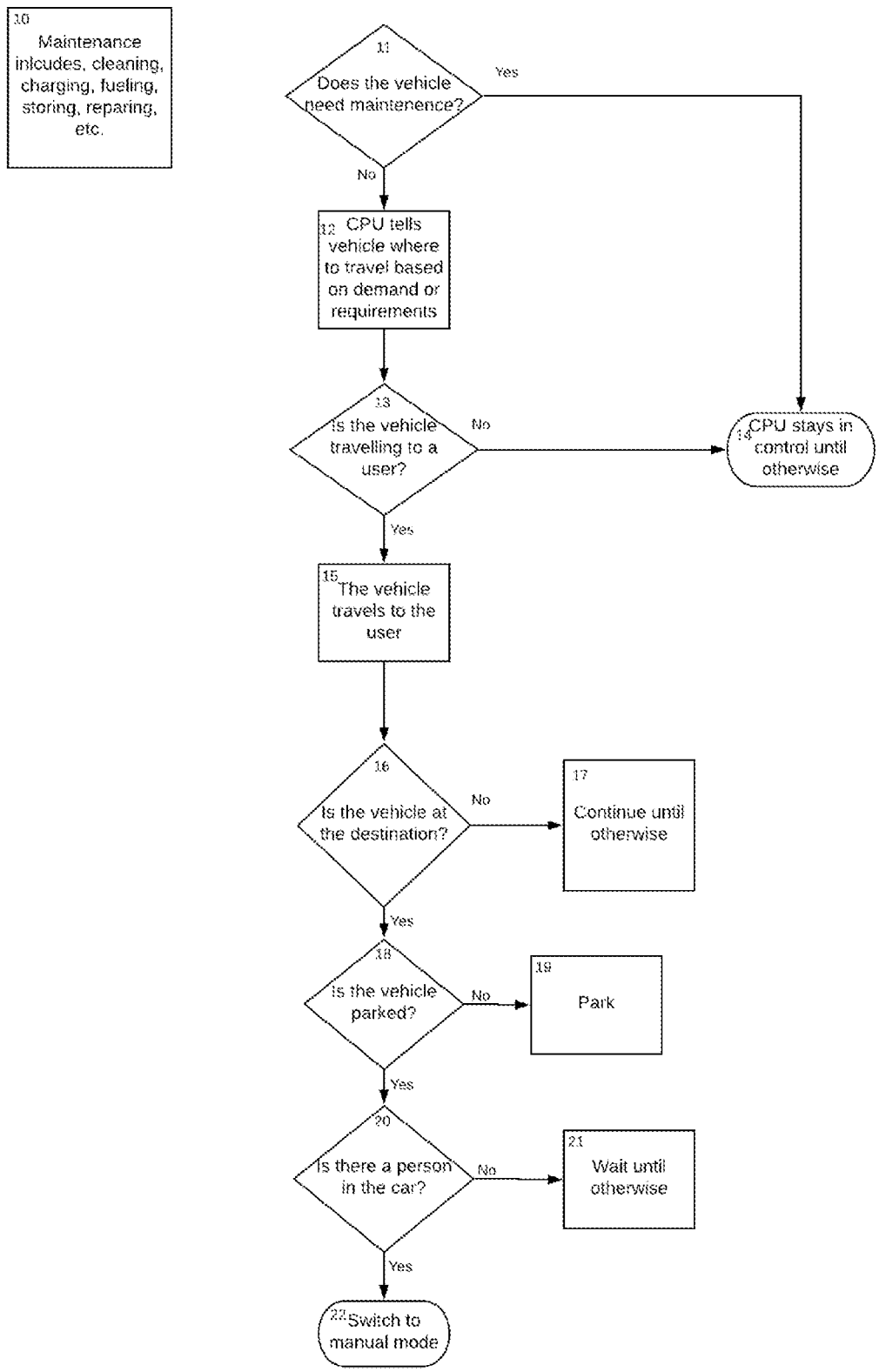
FIG. 2 is a flowchart of the process for switching between the autonomous mode to the manual mode.

Referring now to FIG. 2, the figure illustrates a flowchart which shows the requirements and process of a vehicle shifting from an autonomous mode to a manual mode. The first of these requirements is whether the vehicle needs maintenance. Box 10 explains that maintenance includes (but is not limited to) cleaning of the vehicle, charging or fuelling of the vehicle, repairing, storing, or other types of maintenance. The first requirement of the switching process is shown in step 11. If the vehicle requires maintenance, the vehicle remains in an autonomous mode until no other maintenance is required, as shown in box 14. When the vehicle has completed the maintenance or requires none, the central processor signals to the vehicle where to travel based on user demand or requirements. This step is shown in box 12.

The next requirement of the process is determining if the vehicle is travelling to a user to be switched to manual mode, or if it is travelling to some other destination, not including maintenance. This requirement is shown in the flowchart as box 13. If the vehicle is not travelling to a user, the central processor remains in control of the vehicle and it does not switch to an autonomous mode, see box 14. Otherwise, the vehicle travels to the user, as shown in box 15.

Another requirement for the switch to manual mode is that the vehicle must be at the destination that the user requests, as shown in box 16. If the vehicle is not present at the destination, it must continue in an autonomous mode until it reaches the destination, as represented in box 17.

Another requirement for the switch to manual mode is for the vehicle to be parked, as shown in box 18. If the vehicle is not parked, then switching it to a manual mode would mean, among other issues, a rapid deceleration, which is very likely to cause harm to the vehicle. If the vehicle is not parked, then, as shown in box 19, the system directs the vehicle to park.

Box 20 is a representation of the requirement for there to be a person in the vehicle in order that the car be switched to manual mode, and if there is no person inside the vehicle, box 21, the vehicle waits until there is a person detected inside the vehicle.

Manual mode is unnecessary when there is no person inside the vehicle, so, according to the method of the invention, it is not necessary to switch to manual mode until a passenger or driver is detected. Once a person enters the vehicle, the vehicle shifts to a manual mode, as per box 22.

Figure 3:
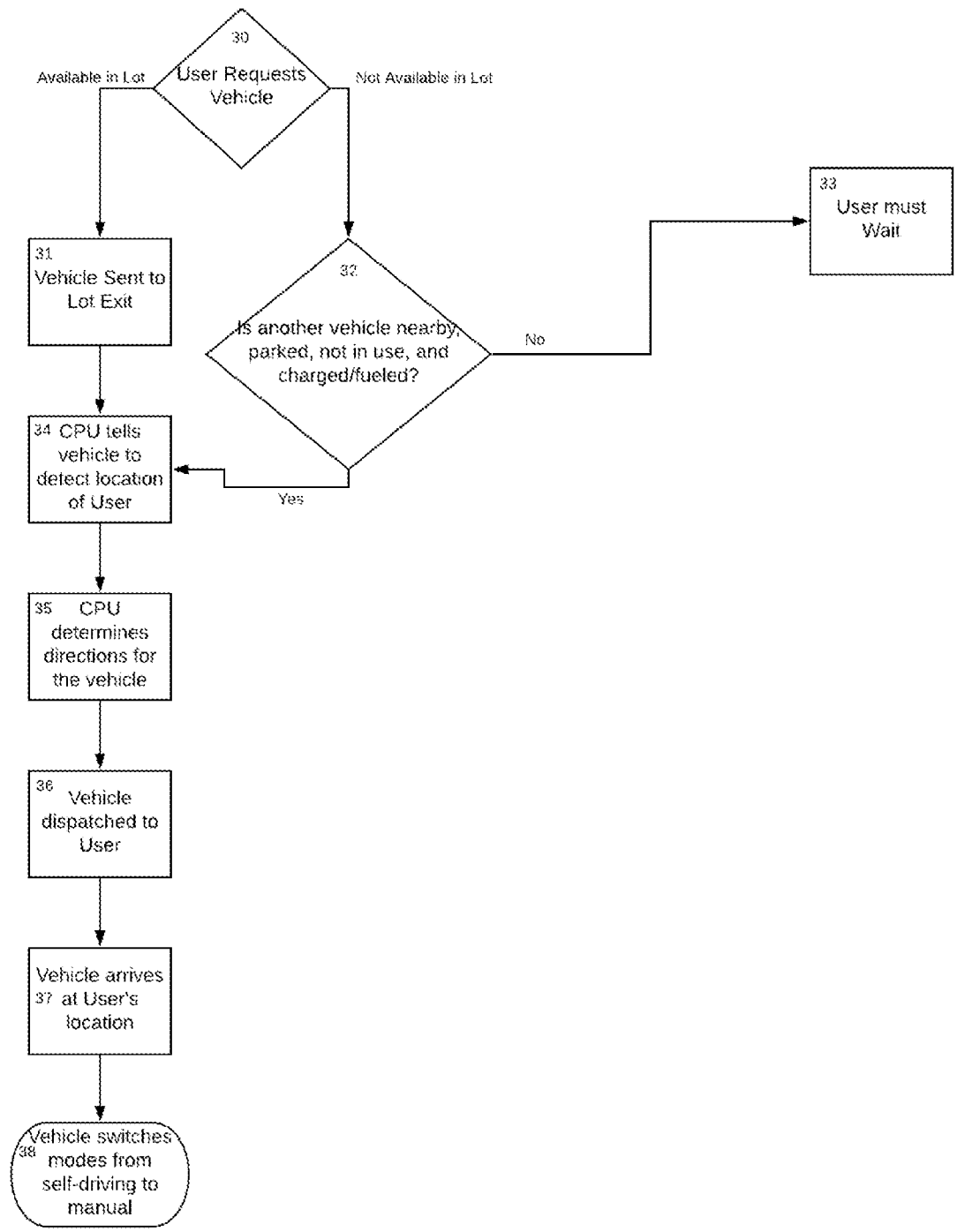
FIG. 3 is a flowchart for the process of bringing a vehicle to a user and switching modes.

FIG. 3 is a flowchart showing the process initiated when a user requests a vehicle. The first step is for the user to request the vehicle via a user device. Such devices include but are not limited to computers, mobile devices, tablets, and any internet-connected device. The requesting is performed through a connection to the central processor, which is represented in box 30. If no vehicle is available in a parking lot, box 32 asks if there is another vehicle which is parked, not in use, and charged or fuelled. If such a vehicle is not available, the user must wait until one is available, as per box 33. If there is such a vehicle available, box 34 directs the central processor to detect the location of the user. After the user requests a vehicle 30, the vehicle is sent to the exit of the lot in which the vehicle was parked, 31, and the central processor tells the vehicle to detect the location of the user, as per box 34. Then the central processor determines directions for the vehicle, box 35, and the vehicle is dispatched to the user, as per box 36. After that, the vehicle arrives to the user's location as set out by box 37, and the vehicle switches modes from autonomous to manual, as per box 38, provided that it satisfies the requirements laid out in FIG. 2.

Figure 4:
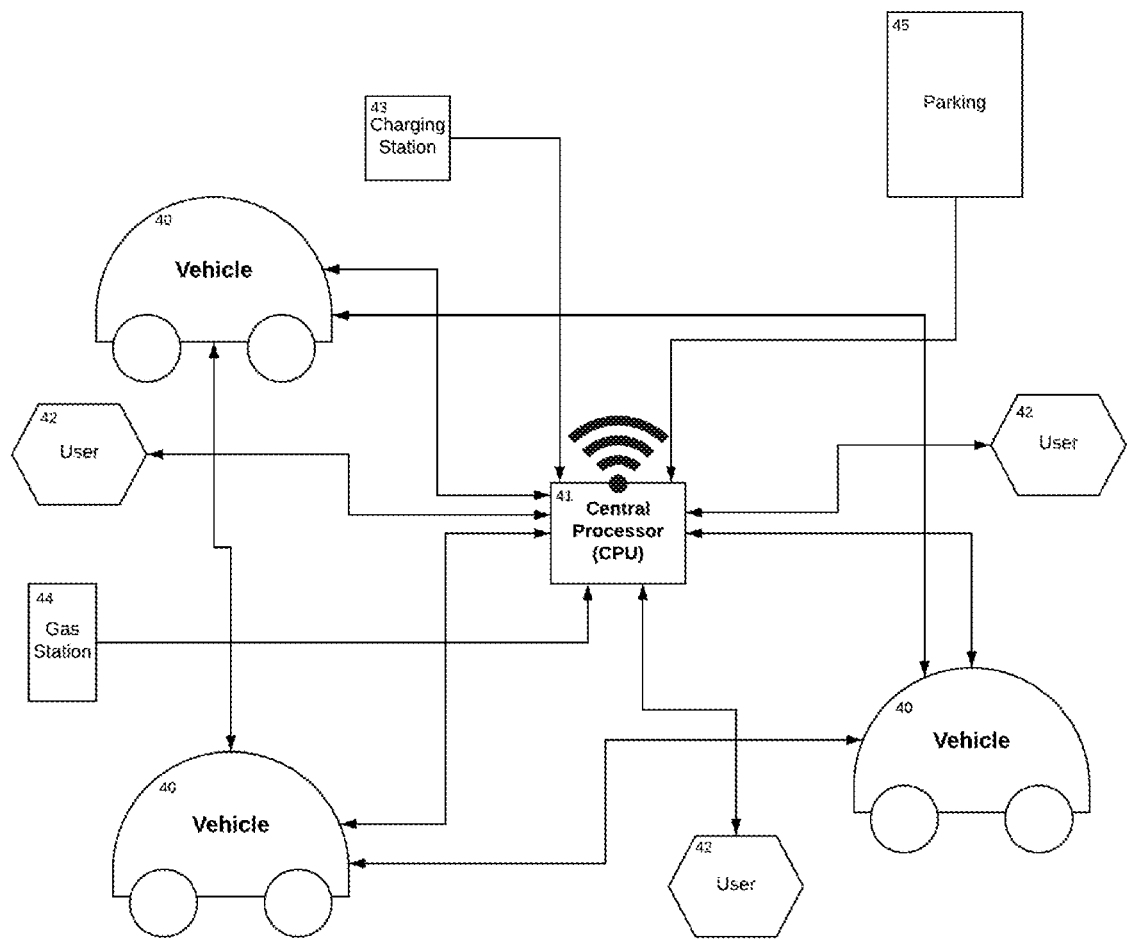
FIG. 4 is a diagram of the connections for communications between vehicles, maintenance stations, users, and the central processor.

FIG. 4 contains a diagram of signals sent from different elements to and from the central processor (CPU). Vehicles 40 send signals to each other as well as to the central computer 41. Vehicles 40 also receive signals from the central processor 41. Users 42 send and receive signals to and from the central processor 41. However, vehicles and users do not send signals to each other directly. This is beneficial because any number of users may sign on to the system as desired, and any vehicle may be removed or added to the system easily without disrupting communication pathways. Maintenance stations such as charging stations 43, gas stations 44, and parking stations 45 send signals to the central processor 41, but do not receive signals. Vehicles 40 and users 42 do not directly communicate with the service stations 43, 44 or parking stations 45, but the central processor 41 acts as an intermediary, connecting those terminals which do not directly communicate.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for operation of vehicles in a mixed mode, comprising:
   providing one or more vehicles,
   each vehicle comprising a control unit and one or more sensors,
   the control unit of each vehicle being communicatively coupled to a central processor,
   the central processor being communicatively coupled to one or more user devices, said one or more user devices sending a request from one or more users for said one or more vehicles, the one or more sensors detecting a presence of a person inside the vehicle, each vehicle having two modes of operation, a manual (human-operated) mode and an autonomous mode, the central processor determining each vehicles' mode, wherein each vehicle automatically shifts from said manual mode to said autonomous mode via steps comprising:
- determining that the vehicle is parked after a use by a first user, and
- determining that no persons are present inside the vehicle, wherein each vehicle automatically shifts from said autonomous mode to said manual mode via steps comprising:
- determining that the vehicle is positioned at a location of a second user,
- determining that the vehicle is parked, and
- determining that one or more persons are present inside the vehicle, wherein the manual mode is required with a person present inside the vehicle, and wherein the autonomous mode is required when no person is present inside the vehicles, and determining a time relationship between a change in the presence of baggage inside the vehicle and a change in the presence of the person inside the vehicle, said change in the presence of baggage being detected by a weight sensor, wherein the vehicle switches between said manual mode and said autonomous mode based on said time relationship.

2. The method of claim 1, wherein an automatic shift from said manual mode to said autonomous mode further comprises enabling a counter, said counter delaying said automatic shift from manual mode to autonomous mode until said counter expires.

3. The method of claim 1, wherein an automatic shift from said autonomous mode to said manual mode further comprises determining that a vehicle maintenance is not required.

4. The method of claim 1, wherein the one or more sensors comprises weight sensors.

5. The method of claim 1, wherein the one or more sensors comprises infrared sensors.

6. The method of claim 1, wherein the one or more sensors comprises lasers.

7. The method of claim 1, wherein the one or more sensors comprises video sensors.

8. The method of claim 1, wherein the one or more sensors comprises audio sensors.

9. The method of claim 1, wherein one or more vehicles are delivered to said one or more users via said autonomous mode.

10. The method of claim 9, wherein one or more vehicles are delivered from the first user to a second user via said autonomous mode.

11. The method of claim 9, wherein the central processor sends a secure key to said one or more users, said secure key allowing the user to access the vehicle.

12. The method of claim 10, wherein said one or more vehicles are delivered from the first user to a second location different from a location of the second user, said location being input by the second user.

13. The method of claim 1, wherein, after determining that maintenance is required, the one or more vehicles are delivered in autonomous mode from a first location to a second location, the second location being a maintenance location.

14. The method of claim 13, wherein maintenance comprises refuelling, recharging, cleaning, and repair.

15. The method of claim 1, wherein the central processor monitors location and performance of the one or more vehicles, and sends signals to the one or more vehicles, said signals including signals to shift between modes.

16. The method of claim 13, wherein the central processor further sends additional signals to the one or more vehicles, said additional signals including locations of additional users.

17. The method of claim 1, wherein the central processor uses real time information to anticipate demand and dispatch the one or more vehicles based on said information.

18. The method of claim 1, further comprising one or more dispatch unit processors, each dispatch unit processor being associated with a designated local area, wherein said control processor reroutes one or more requests to a corresponding dispatch unit processor.

19. The method of claim 1, wherein each vehicle is connected only through the central processor.

\* \* \* \* \*